R. C. JONES.
EVAPORATOR.
APPLICATION FILED FEB. 1, 1916.

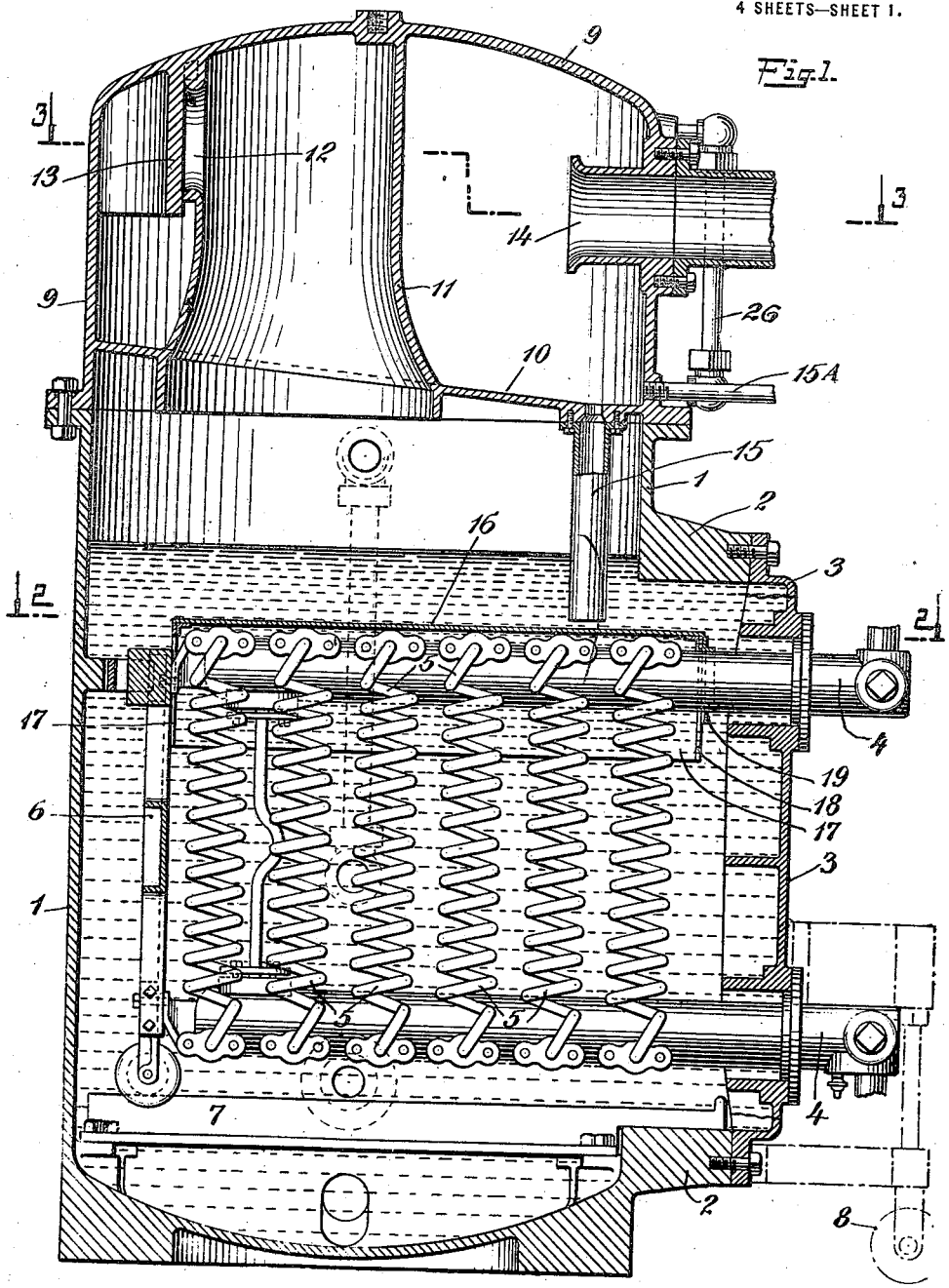

1,299,955.

Patented Apr. 8, 1919.
4 SHEETS—SHEET 2.

Inventor
Russell C. Jones
By his Attorneys
Pennie, Davis & Marvin

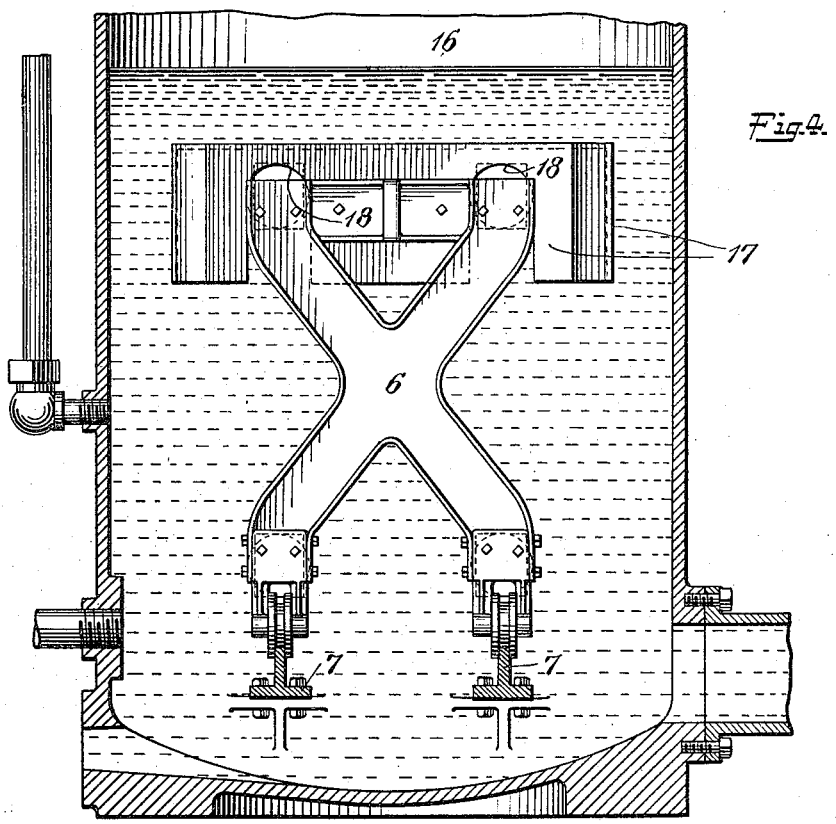
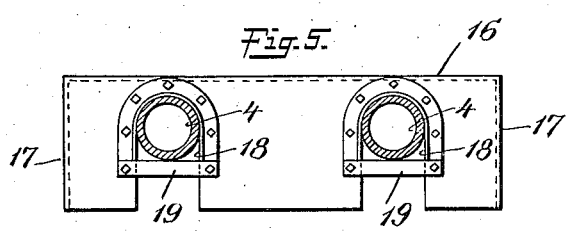
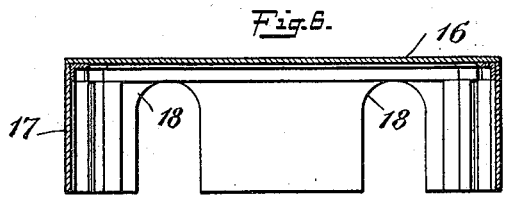

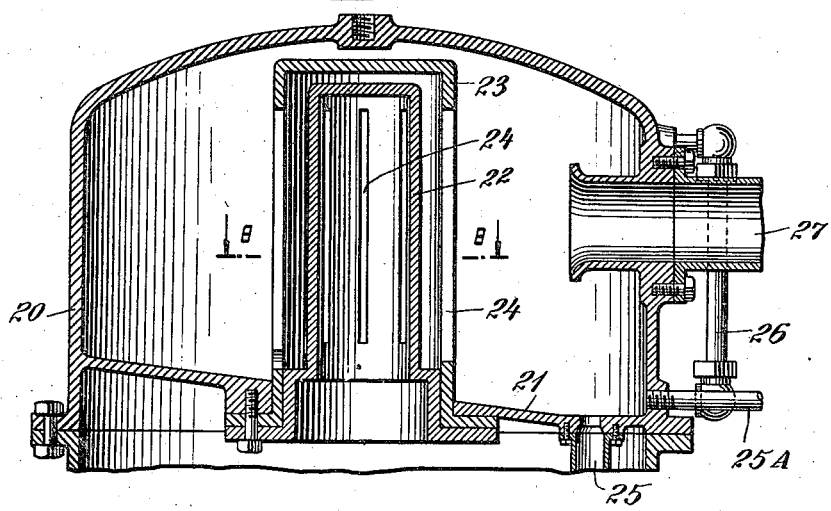
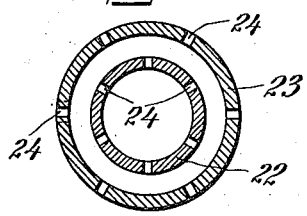
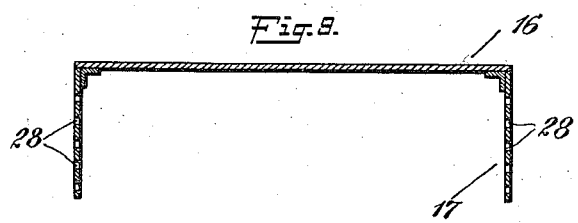
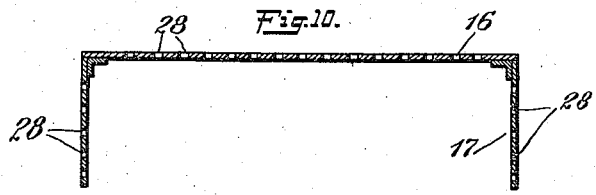

UNITED STATES PATENT OFFICE.

RUSSELL C. JONES, OF GARDEN CITY, NEW YORK, ASSIGNOR TO THE GRISCOM-RUSSELL COMPANY, A CORPORATION OF DELAWARE.

EVAPORATOR.

1,299,955.  Specification of Letters Patent.  Patented Apr. 8, 1919.

Application filed February 1, 1916. Serial No. 75,604.

*To all whom it may concern:*

Be it known that I, RUSSELL C. JONES, a citizen of the United States, and resident of No. 15 Franklin Court, Garden City, county of Nassau, State of New York, have invented certain new and useful Improvements in Evaporators; and I do hereby declare the following to be a full, clear, and exact description of the invention, such as will enable others skilled in the art to which it appertains to make and use the same.

This invention relates to evaporators, and particularly to evaporators designed for use in the distillation of salt water or other water having scale-forming impurities which make it unfit for use in steam boilers.

The invention, however, is applicable to evaporators for any purpose where purity of product and large capacity in proportion to heat employed and space occupied, is important.

The evaporator now on the market which is most generally used for the evaporation of sea water is known as the "multi-coil" type, and comprises in its essential features a chamber for the water to be evaporated with transverse upper and lower manifolds for the heating fluid, usually live steam, and banks of closely wound coils of copper or other suitable tubing, detachably connecting the upper and lower manifolds to provide the heating surface. Each pair of manifolds is usually connected to a detachable section of the shell wall so that an entire group of heating coils may be withdrawn from the shell for cleaning or for the substitution of a new coil for a defective one. A separator head is mounted on top the shell to separate from the vapor any entrained particles of salt water.

In the operation of such evaporators the shell is filled only to a point about one-third the height of the coil, for the reason that sea water boils with much surface agitation which produces a great deal of foam and spray, causing the vapor to be filled with more entrained water than can be taken out by the separator head. By maintaining the water level at a low point on the height of the coils the upper exposed portion of the coils acts as a superheater breaking down and vaporizing the bubbles and globules of entrained water which come in contact with the coils so that the quantity of water in the vapor is materially reduced before it passes into the separator head. This construction, however, has the disadvantage of low efficiency due to the large waste space in the evaporator shell which can be only partially remedied by causing a violent ebullition in the water-containing portion of the shell as by means of closely wound and closely grouped coils and circulation plates such as described in the patent to R. R. Row, Patent No. 1,131,738, dated March 16, 1915. The construction has also the further and greater disadvantage of scaling to a degree which renders constant cleaning and repair necessary to keep the evaporators in operation. This scaling takes place chiefly on the exposed portion of the coil, the salts in the water being dried out by the superheating effect of the coils and baked hard to the metal of the coils.

The object of my invention is to provide an evaporator of the multi-coil type in which the entire heating surface of the coils and manifolds is submerged in the water to be evaporated, thereby preventing the accumulation of scale on any portion of the heating surface and at the same time utilizing efficiently the entire space within the shell and obaining a greater quantity of distilled water per heat unit consumed than heretofore.

A further object of the invention is to provide a construction whereby the coils are maintained free of scale to an extent even greater than the submerged portions of the coils of evaporators heretofore used and with which the vapor passing to the separator head is exceptionally free from entrained water.

In the accompanying drawings and the following description, I have shown and described a preferred form of evaporator embodying the principles of my invention which is now in practical operation. It is to be understood, however, that my invention is not limited to the details of construction herein disclosed, but covers all such modifications thereof as fall within the scope of the appended claims.

In said drawings,

Figure 1 shows in vertical section an evaporator embodying my invention;

Fig. 4 is a vertical section at right angles to Fig. 1 but showing the supporting frame of the coils in elevation;

Figs. 5 and 6 are detail views of the "baffle-box" constituting one of the novel elements of my improved evaporator;

Fig. 7 shows in vertical section a modified construction of separator head;

Fig. 8 is a sectional view on line 8—8 of Fig. 7; and

Figs. 9 and 10 are detail views of modified forms of my improved baffle box.

Figure 3:
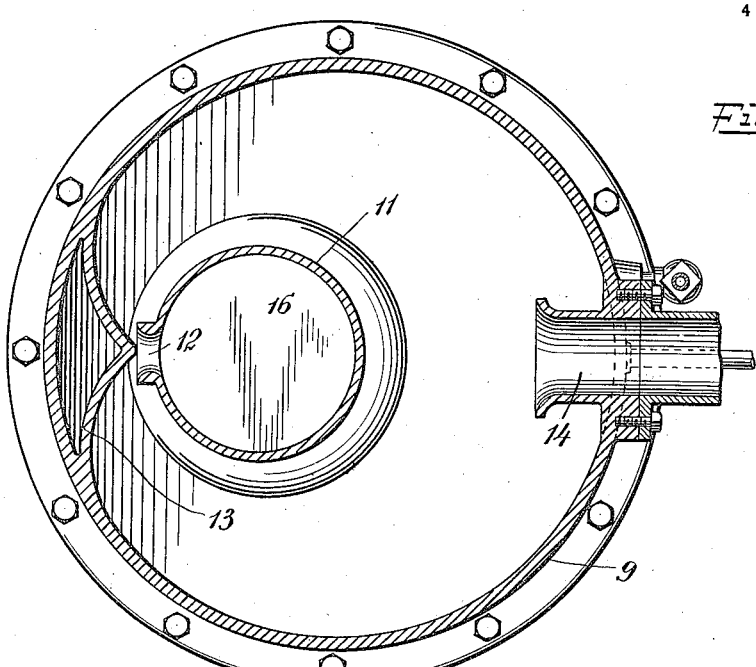
Fig. 3 is a cross-section through the separator head on line 3—3 of Fig. 1.
Figure 2:
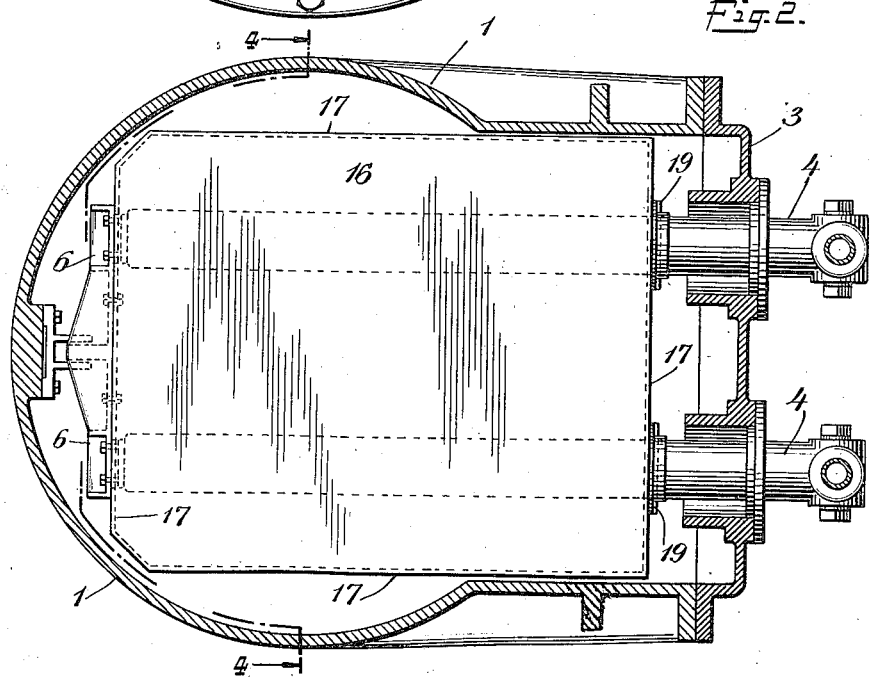
Fig. 2 is a cross-section through the evaporator shell on line 2—2 of Fig. 1.

In the drawings, 1 indicates the shell of the evaporator here shown as of the vertical type and circular in horizontal cross-section except for the extension 2 at one side which provides a face for the attachment of the plate 3 carrying the manifolds 4 for the steam or other heating fluid. The plate 3 is detachable in the usual manner to permit the withdrawal of the manifolds and attached coils 5 of which two rows are provided for each pair of manifolds. To facilitate the withdrawal of the coils, frame 6 which supports the inner ends of the manifolds is provided with suitable rollers running on tracks 7 within the shell. The plate 3 is also provided with an outer roller or rollers 8, as shown in dotted lines in Fig. 1. The construction of the parts so far described except for dimensions and the specific construction of the individual coils is substantially similar to that shown and described in the patent to Reuben Row, above referred to.

The upper end of the shell 1 is closed by the separator head 9 which comprises a bottom web 10 extending across the shell a short distance above the upper manifold and having a drum or stand pipe 11 opening into the shell at its lower end to receive the vapor generated in the shell. The drum 11 is closed at its upper end by the top wall of the separator head, but is provided near the top with an egress passage 12 comprising an elongated vertical nozzle projecting from its wall. Opposite the steam passage 12 is a vertical deflector 13 projecting from the outer wall of the separator head with its ridge opposite the middle line of the passage and closely adjacent the edges of the nozzle. The opposite faces of the deflector are curved to a suitable stream-line which blends into the inner face of the outer wall of the separator head, whereby the steam or vapor issuing from the passage 12 will be divided by the ridge 13 and directed around the wall of the shell to the delivery tube 14 projecting inwardly from the wall of the head at a point diametrically opposite the ridge 13. The momentum of the entrained globules of water due to the high velocity acquired by the passage of the steam through the nozzle causes the water to impinge against, and adhere to, the walls of the shell when the direction of the steam jet is changed by the deflecting surfaces, leaving the vapor drawn through the tube 14 to the condensers free of all impurities. The inwardly projecting tube 14 prevents any moisture adhering to the wall of the separator head from being drained into the delivery pipe. The web 10 slopes to one side for the collection of the water and is provided with a pipe 15 which projects below the surface of the water in the shell so that the water separated in the head will be drained back into the shell without permitting the passage of steam into the head except through the drum 11.

A gage glass 26 may be provided to indicate the depth of water in the separator head. If the water accumulates faster than it is drained off by the pipe 15 the rising level in the gage glass will indicate to the attendant that the device is not functioning properly, so that it may be readjusted or shut off before the impurities can be carried into the condenser. An external drain pipe 15$^A$ may also be provided to be used either with the pipe 15 or in place of it. The pipe 15$^A$ may be provided with a cut-off valve to be opened only when the water rises in the saparator head.

As stated above, my improved evaporator is designed to be operated with the coils fully submerged and with the water level close to the web 10. In order to operate the evaporator in this manner without excessive priming which would flood the separator head, I have provided a novel "baffle-box" construction which consists of a metal plate 16 supported across the top of the upper manifolds and provided on all four sides with flanges 17 which extend downwardly to a point well below the upper manifolds. The flanges at the front and rear edges are notched as shown at 18 in Fig. 4 to receive the manifolds and the "baffle-box" is attached to the manifolds by means of cross-bars 19 extending across the notches below the manifolds. The coils employed in my improved evaporator are "open" coils instead of the closely wound coils of the present evaporator construction shown in the above mentioned patent, being preferably wound with a space between each adjacent turn of the coil equal at least to the diameter of the pipe forming the coil. The dimensions of the plates 16 are such that the flanges 17 inclose the top ends of the coils on all four sides.

In operation the shell will be maintained filled with salt water to the level indicated or at least to a point above the top of the manifolds, and the upper and lower manifolds will be connected to the steam supply, and exhaust, respectively. The water will be vaporized around the coils by the steam and the vapor will accumulate in the box formed by the plate 16 and its depending flanges. The accumulation of vapor will force down the level of water under the baffle-box until the vapor escapes around the edges of the flanges and passes up through the water and thence into the separator head. With coils of small diameter the heating surface on the inside of the coil which is almost half the total heating surface is so large relatively to the volume of water within the coil that the boiling is necessarily very violent, producing an action that is almost explosive which, but for the baffle-box, would project the water violently upward in jets corresponding with each coil. The baffle-box not only intercepts these jets of vapor and water from the center of the coil, but forces the vapor to pass back through the water beyond the area of the coils before it can pass into the separator head. The vapor generated within the coils is collected under the baffle-box and directed outwardly through the water outside the space occupied by the coils distributing the heat absorbed within the coils through the body of water beyond the coils. Also the metal of the baffle-box will absorb heat from the vapor generated around the coils and transmit such heat to the water above so that the vapor escapes quietly from the entire surface of the water without the explosive action which causes priming of the vapor.

By using an open coil of the character described, the area of the heating surface on the interior of the coil relatively to the length of the coil is much reduced, the circulation of water laterally through the coil is very much increased, and the vertical spouting is reduced to a marked degree. By means of this open coil I entirely prevent the formation of scale which heretofore accumulated on the submerged portions of the closely wound coils, although of course to a much less degree than on the exposed portions of the coils. This freedom from scale may be accounted for partially by the greater circulation of the water between the turns of the coil, and also by different effect of the expansion and contraction from the heat, due to the shorter length of pipe relatively to the axial length of the coil.

The plate 16 with its depending flanges which I have termed the "baffle-box" for want of a better name, has the effect of distributing the heat heretofore concentrated in the center of the shell throughout the body of the water, so that the vaporization takes place in all parts of the shell.

Actual experiment has demonstrated that although the surface of the water is close to the bottom of the separator head, there is much less water carried into the separator head than heretofore and the steam consumption per pound of distilled water produced is materially reduced. Also, the purity of the water is improved for the reason that with the high superheating effect of the exposed portions of the coils the salts in the water will be to some extent broken down and their component gases will be carried along with the vapor and absorbed in the water of condensation. With my improved evaporator all portions of the heating surface are submerged and such action is prevented.

In Figs. 7 and 8 I have shown an approved form of separator head designed to permit the easy passage of a large volume of vapor, and with provisions for indicating the amount of water being carried into the separator head by the vapor. This head comprises an outside dome 20 similar to the dome of the previously described head and adapted to be attached to the upper edge of the shell. The dome is formed at the bottom with a web 21 closing the top of the shell except at the center where it is fitted with a pair of concentric drums 22, 23, each of which is provided throughout its periphery with spaced vertical openings or slots 24. At their bottom ends the drums fit closely one in the other, and fill the orifice in the web 21 so that the vapor generated in the shell passes upward into the inner drum. The slotted portion of the inner drum is reduced in diameter to provide a space between the drums, and the drums are arranged so that the slots in the two drums are staggered, to present a solid wall of the outer drum opposite the openings in the inner drum.

The web 21 slopes to one side and at its lowest edge is provided with a small pipe 25 projecting into the shell below the water line for the passage of the water separated out of the vapor back into the shell. The outer dome is provided with a gage glass 26 on the same side as the drain pipe 25 to indicate the quantity of water accumulating in the dome.

A supplemental drain pipe 25$^A$ may also be provided, as with the previously described form of separator.

The vapor with the entrained water is forced by the pressure in the shell through the openings in the inner drum with sufficient velocity for the water to be projected against the wall portions of the outer drum, while the lighter vapor is drawn under suction through the pipe leading to the condensers through the slots in the outer drum. The water drains to the bottom of the space between the drums and thence into the outer chamber of the separator head. If the water accumulates in the separator head faster than it can pass through the small pipe 25, the level of the water will show in the gage glass 26 so that the attendant can readjust the flow of the heating fluid or otherwise correct the trouble.

Instead of forming the baffle-box as above described so as to force all the vapor generated thereunder out beneath the edges of the baffle-box, I may perforate the metal of the side walls of the baffle-box as indicated at 28 in Fig. 9, to allow the vapor to escape in fine streams through the water surrounding the baffle-box; or both the top and side walls may be perforated as indicated in Fig. 10 to distribute the vapor generated in the baffle-box through the entire volume of water above the coils.

It will of course be understood that with perforated baffles the perforations are not large enough to allow jets of water to be forced into the separator head.

It will also be understood that the structure shown and described may be modified in other details without departing from the spirit of the invention.

The term "box" as used in the appended claims is not to be understood as limited to the configuration shown, or to any particular design, nor is it material whether the walls are flat or curved, for instance a semispherical or semicylindrical baffle would generically be the equivalent of the box shown and described.

I claim:

1. In an evaporator, the combination with a shell of heating tubes within the shell, said shell being adapted to contain the liquid to be evaporated with the liquid level maintained so that the tubes are submerged in the liquid and a baffle arranged over the tubes and extending below the liquid level, said baffle having portions arranged to deflect the vapor generated by the tubes beneath the baffle laterally through the liquid to points beyond the space occupied by the tubes before the vapor leaves the surface of the liquid.

2. In an evaporator a shell to contain the liquid to be evaporated, vertically arranged heating elements submerged in the said liquid, a baffle above said heating elements and extending laterally beyond the space occupied by said elements, said baffle being arranged to deflect the vapor produced beneath the baffle laterally through the liquid before the vapor leaves the surface of the liquid.

3. In an evaporator, the combination with a shell of heating coils within the shell, said shell being adapted to contain the liquid to be evaporated with the liquid level maintained so that the coils are completely submerged in the liquid, and a baffle arranged over the coils and extending below the liquid level, said baffle having portions arranged to deflect the vapor generated by said coils beneath said baffle laterally through the liquid to points beyond the space occupied by the coils before the vapor leaves the surface of the liquid.

4. In an evaporator, the combination with a shell of heating coils within the shell, said shell being adapted to contain the liquid to be evaporated with the liquid level maintained so that the coils are submerged in the liquid and a baffle arranged over the coils and provided with downwardly extending edges projecting below the liquid level whereby the vapor generated by the coils beneath the baffle is collected beneath the baffle and directed laterally through the liquid to points beyond the space occupied by the coils before the vapor leaves the surface of the liquid.

5. In an evaporator, the combination with a shell of heating coils within the shell, said shell being adapted to contain the liquid to be evaporated with the liquid level maintained so that the coils are submerged in the liquid, upper and lower manifolds supporting said coils, and a baffle comprising a box open on its under side and supported above said manifolds, the top of the box being of greater horizontal extension than the space occupied by said coils and with its side edges projecting downwardly below the liquid level and inclosing the upper ends of said coils.

6. In an evaporator, the combination with a shell of heating coils within the shell, said shell being adapted to contain the liquid to be evaporated with the liquid level maintained so that the coils are completely submerged in the liquid, upper and lower manifolds supporting said coils and submerged in the liquid, and a box open at its under side and supported over said upper manifolds, the top wall of the box being of greater horizontal extension than the space occupied by said coils, the side walls transverse to the manifolds having openings to receive the upper manifolds, the said side walls being of sufficient depth for their lower edges to project below the manifolds and inclose the upper ends of the coils.

7. In a multicoil evaporator, the combination with a shell of heating coils within the shell, said shell being adapted to contain the liquid to be evaporated with the liquid level maintained so that the coils are submerged in the liquid, upper and lower manifolds supporting said coils, each of said coils being wound with a space between each turn thereof sufficient for the liquid contained in the bore of the coil to be replenished by the liquid exterior to the coils as rapidly as the liquid in such bore is evaporated, and a baffle over the coils, said baffle having portions below the liquid level for deflecting the vapor generated within said coils to points beyond the space occupied by said coils before the vapor leaves the surface of the liquid.

8. In a multicoil evaporator, the combination with a shell of heating coils within the shell, said shell being adapted to contain the liquid to be evaporated with the liquid level maintained so that the coils are submerged in the liquid, upper and lower manifolds supporting said coils, each of said coils being wound with an open space between adjacent turns thereof, and a concave baffle arranged over the coils with its lower edges submerged in the liquid and of greater lateral extent than the space occupied by the coils and surrounding the upper ends of said coils, whereby the vapor generated by said coils will collect beneath the baffle and pass below the edges of the baffle and beyond the space occupied by the coils before leaving the surface of the liquid.

9. In a multicoil evaporator, the combination with a shell of heating coils within the shell, said shell being adapted to contain the liquid to be evaporated with the liquid level maintained so that the coils are completely submerged in the liquid, a baffle submerged in said liquid above the coils and designed to collect the vapor generated by said coils and retain a collection of vapor from which vapor passes laterally through the liquid to points beyond the space occupied by the coils before leaving the surface of the liquid.

10. In a multicoil evaporator, the combination with a shell of heating coils within the shell, said shell being adapted to contain the liquid to be evaporated with the liquid level maintained so that the coils are completely submerged in the liquid, upper and lower manifolds supporting said coils and a concave baffle supported above said coils its downwardly projecting sides inclosing the upper ends of said coils, said baffle being provided with fine perforations for the passage of vapor therethrough.

11. In a multicoil evaporator, the combination with a shell of heating coils within the shell, said shell being adapted to contain the liquid to be evaporated with the liquid level maintained so that the coils are completely submerged in the liquid, upper and lower manifolds supporting said coils and submerged in the liquid and a baffle supported on said manifolds comprising an inverted box having its downwardly projecting side walls inclosing the upper ends of said coils, said side walls of said box being provided with fine perforations for the passage of vapor therethrough.

In testimony whereof I affix my signature.

RUSSELL C. JONES.